United States Patent [19]
Kato et al.

[11] Patent Number: 5,632,250
[45] Date of Patent: May 27, 1997

[54] GAS FUEL SUPPLY SYSTEM FOR VEHICLE

[75] Inventors: Atsushi Kato; Yoshikazu Ohshima; Eisaku Gosho; Kazuhiro Ueda; Shigeo Hidai; Akira Murakami; Toshiyuki Nishida; Shigeru Aoki; Ryuichi Noseyama; Kenichiro Ishibashi; Katsunori Nakamura; Nobuo Arai, all of Wako, Japan

[73] Assignee: Honda Giken Kogyo Kabushiki Kaisha, Japan

[21] Appl. No.: 530,525

[22] Filed: Sep. 19, 1995

[30]   Foreign Application Priority Data

| Sep. 20, 1994 | [JP] | Japan | 6-225147 |
|---|---|---|---|
| Sep. 20, 1994 | [JP] | Japan | 6-225151 |
| Sep. 20, 1994 | [JP] | Japan | 6-225208 |
| Sep. 20, 1994 | [JP] | Japan | 6-225215 |
| Sep. 20, 1994 | [JP] | Japan | 6-225294 |

[51] Int. Cl.$^6$ ............................................. F02M 51/00
[52] U.S. Cl. ......................... 123/490; 123/198 DB; 123/491
[58] Field of Search ............................. 123/490, 491, 123/529, 198 DB, 458

[56]   References Cited

U.S. PATENT DOCUMENTS

| 2,632,430 | 3/1953 | MacSporran | 123/529 |
|---|---|---|---|
| 4,704,997 | 11/1987 | Endo et al. | 123/198 DB |
| 4,721,078 | 1/1988 | Watanabe et al. | 123/198 DB |
| 4,741,306 | 5/1988 | Watanabe et al. | 123/198 DB |
| 5,179,922 | 1/1993 | Bartholomew | 123/198 DB |
| 5,357,935 | 10/1994 | Oxley et al. | 123/198 DB |
| 5,485,820 | 1/1996 | Iwaszkiewicz | 123/458 |

FOREIGN PATENT DOCUMENTS

| 61-113967 | 12/1984 | Japan . |
|---|---|---|
| 61-268855 | 11/1986 | Japan . |
| 61-272455 | 12/1986 | Japan . |
| 62-139710 | 6/1987 | Japan . |
| 62-142853 | 6/1987 | Japan . |
| 62-170759 | 7/1987 | Japan . |
| 63-035827 | 7/1988 | Japan . |
| 7-189813 | 12/1993 | Japan . |

*Primary Examiner*—Raymond A. Nelli
*Attorney, Agent, or Firm*—Merchant, Gould, Smith, Edell, Welter & Schmidt

[57]   ABSTRACT

Supply of fuel is stopped when fuel pressure sensed by a pressure sensor provided upstream of a regulator is at a predetermined value or less to avoid abnormal combustion caused by improper adjustment of air/fuel ratio. Even slight variation of the fuel pressure is sensed by monitoring the fuel pressure in an interval after closing a fuel shut-off valve once opened to re-opening of it. In addition, an abnormal state in the fuel system is detected by comparing an accumulated value of amount of injected fuel and an estimated value of fuel consumption in the tank. Furthermore, the peak current value of the fuel injection valve is controlled so that, when the engine at a low temperature is started, lift load of the injection valve is larger than sticking force of the injection valve, thereby preventing such situation where the injection valve is frozen so that it cannot supply fuel to the engine. In this case, the engine can be smoothly started by simultaneously controlling the valve open time. Furthermore, the temperature of the regulator is properly maintained so that optimum function can be exhibited by controlling the flow rate of cooling water flowing through a water passage provided in the regulator for regulating the fuel gas pressure.

16 Claims, 16 Drawing Sheets

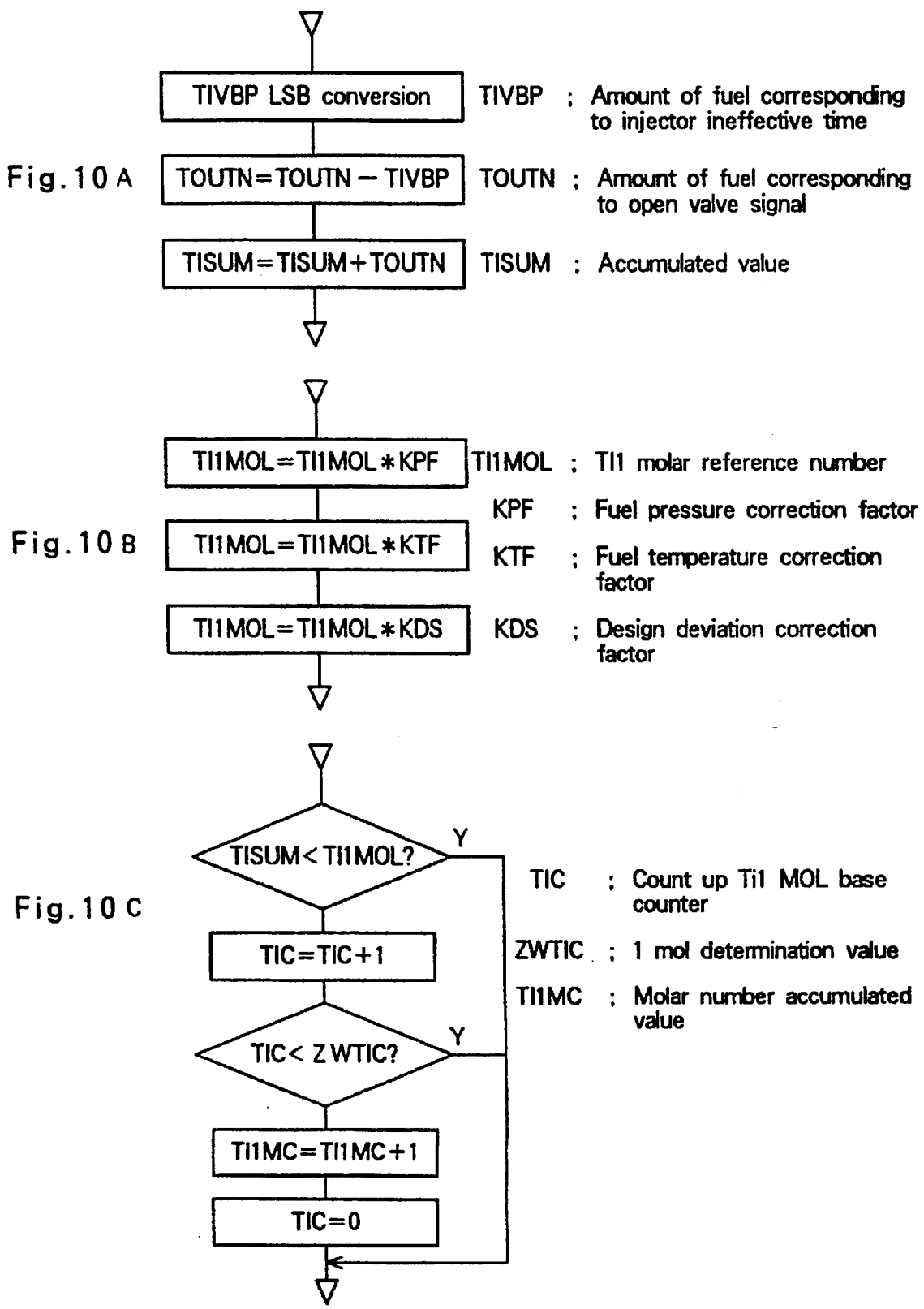

Fig.14
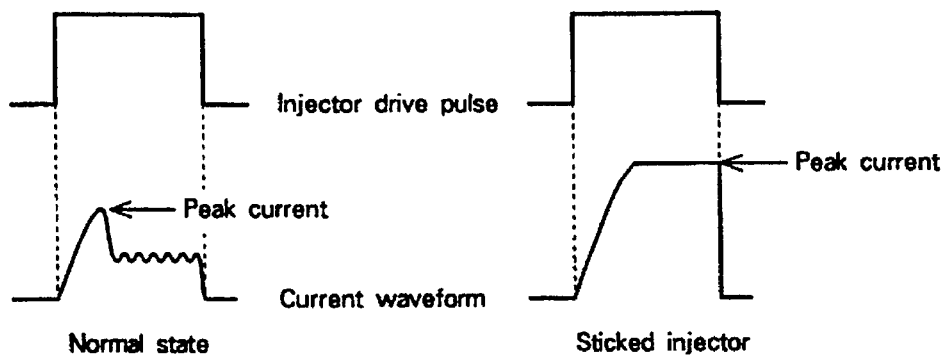
Fig.15
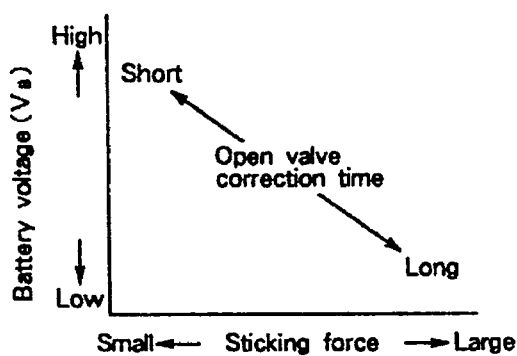
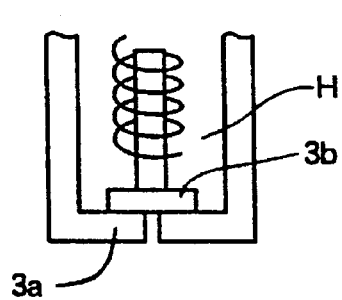
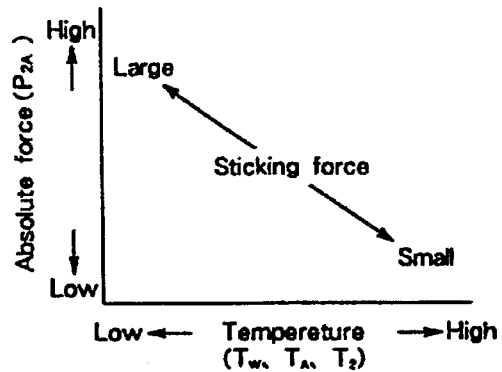
Fig.16A  Fig.16B

GAS FUEL SUPPLY SYSTEM FOR VEHICLE

FIELD OF THE INVENTION

The present invention relates to a gas fuel supply system for a vehicle, and, more particularly, a fuel cut-off unit through sensing of slight pressure change in a fuel piping, a sensing system for abnormal state of the fuel system, a controller for fuel injection, and a regulator for regulating pressure of fuel gas.

BACKGROUND OF THE INVENTION

Conventionally, a vehicle, running with a gas such as compressed natural gas (CNG) as fuel, supplies gas fuel, stored in a gas tank under high pressure, to the combustion chamber of an engine by regulating it to a predetermined pressure with a regulator. For example, Japanese Patent Laid-Open Publication No. 62-139720 discloses a technique in which such regulator is divided into a plural number and shows how they are disposed. In addition, Japanese Utility Model Laid-Open Publication No. 61-113967 discloses a technique in which a pressure switch is provided in fuel piping to warn when the fuel gas pressure lowers to less than a predetermined value.

In a vehicle using a gas as fuel, if the pressure of the gas supplied to the engine changes, the air/fuel ratio becomes impossible to control, causing abnormal combustion due to, for example, flame-out, over-lean or over-rich ratios. It is desirable to avoid such a situation. In addition, when abnormal sensing means is provided in the fuel piping for detecting an abnormal state, it is necessary to provide proper warning.

Furthermore, in the above-mentioned vehicle running with a gas such as compressed natural gas, the gas fuel stored in a gas tank under high pressure is supplied to the combustion chamber of the engine through fuel piping, and it is typical to dispose a fuel shut-off valve in the fuel piping. For example, a fuel shut-off device disclosed in Japanese Patent Publication No. 6-58092 opens a fuel shut-off valve provided in the fuel piping except when the start switch is opened (turned off) and the engine stops.

However, in the conventional gas fueled vehicle, since the fuel shut-off valve is always opened during operation of the engine to supply the gas fuel, the gas pressure in the fuel piping cannot be exactly detected if there is a slight change of pressure within an error allowed.

Moreover, to detect an abnormal state in the fuel supply system of a gas fueled vehicle, it is typical to provide a pressure sensor in the fuel supply path, and to determine an abnormal state with pressure change detected by the pressure sensor. A technique is also known in which, as disclosed in Japanese Patent Laid-Open Publication No. 61-272455, a fuel velocity sensor is provided in the fuel supply path to determine an abnormal state in the fuel system by change in flow velocity detected by the flow velocity sensor.

However, when an abnormal state is to be detected by the pressure sensor, it cannot be determined to be abnormal unless the range of fuel pressure reduction relates to maximum fuel consumption of the engine because otherwise detection is impossible since pressure change is too small. In addition, when an abnormal state is detected by the pressure sensor, the detection cannot be performed with high accuracy unless the fuel temperature is taken into consideration. The technique disclosed in Japanese Patent Laid-Open Publication No. 61-272455 basically has a similar problem.

Furthermore, a fuel injection unit of a vehicle is arranged to inject fuel by causing a current to flow through a solenoid coil of an injector under electronic control, and by moving a valve with magnetic force to form a gap with an injection nozzle. Japanese Patent Publication 63-35827, for example, is intended to shorten the operation time by supplying a large current in the initial stage when the fuel injection valve is opened, and then to quickly control the operation and switching characteristics of the fuel injection valve by reducing the current to a value not lower than the holding current.

However, in a case of the gas fueled vehicle, when the temperature decreases, water contained in oil and methane gas in a compressor when charging the gas and that generated at combustion tend to freeze so that there arises a situation where the fuel injection valve becomes difficult to open and the engine is difficult to be activated, particularly at its starting.

In addition, in the vehicle running with the gas such as the compressed natural gas as the fuel, the gas stored in the gas tank under high pressure of about 200 kg/cm$^2$ is decompressed by a regulator to a predetermined pressure, and supplied to the engine. To avoid difficulty in supply of the fuel when the fuel is quickly cooled by adiabatic expansion due to decompression, the applicant has proposed a regulator as Japanese Patent Application No. 5-351891. The regulator prevents the problem due to quenching by introducing the cooling water heated through circulation in the engine.

Furthermore, regulators disclosed in Japanese Patent Laid-Open Publication Nos. 62-142853 and 62-170759 are also known. The technique disclosed in the above-mentioned Japanese Patent Laid-Open Publication No. 62-142853 holds constant the temperature of the regulator by a positive temperature coefficient (PTC) heater, the electrical resistance of which increases as the temperature rises. The technique disclosed in the above-mentioned Japanese Patent Laid-Open Publication No. 62-170759 maintains a temperature by introducing the heat in the exhaust system from a heat pipe to the regulator.

However, the Japanese Patent Laid-Open Publication Nos. 5-351891 and 62-170759 merely circulate the engine cooling water through the regulator, or introduce the heat from the exhaust system so that, when the temperature of engine cooling water, flow rate, or exhaust temperature changes, the temperature of the regulator changes accordingly so that the accuracy of pressure regulation tends to drift. In addition, when the PTC heater is used as in the Japanese Patent Laid-Open Publication No. 62-142853, the temperature of the regulator can be maintained constant, but the setting temperature cannot be changed easily.

A first object of the present invention is therefore to prevent defective regulation of the air/fuel ratio due to reduction of fuel pressure of a gas engine vehicle.

A second object of the present invention is to enable sensing of even slight variation of fuel pressure in a fuel piping of a gas engine vehicle so that countermeasures can be taken early.

A third object of the present invention is to accurately sense even a slight indication of an abnormal state in the fuel system of a gas engine vehicle.

A fourth object of the present invention is to prevent the situation where fuel cannot be supplied when the fuel injection valve is frozen when the engine at a low temperature is started in a cold district.

A fifth object of the invention is to properly hold the temperature of a regulator for regulating the pressure of fuel gas for a water-cooled gas engine vehicle so as to optimize the performance.

SUMMARY OF THE INVENTION

The arrangement of a gas fuel supply system of a vehicle according to the present invention comprises fuel supply stop means for avoiding abnormal combustion caused from improper adjustment of the air/fuel ratio due to reduction of fuel pressure in a gas engine of the vehicle; fuel shut-off means enabled to detect even a slight variation of the fuel pressure by monitoring the fuel pressure for re-opening in an interval after closing a fuel shut-off valve once opened; fuel system abnormal state sensing means for sensing an abnormal state in the fuel system by comparing an accumulated value of the amount of injected fuel with a calculated value of consumption of fuel in a tank; fuel injection valve control means for increasing lift load for the fuel injection valve at starting the engine at a low temperature and for enabling it to control valve open time; and a first regulator for holding the temperature of a second regulator regulating the fuel gas pressure, and for optimizing its performance by controlling the flow rate of cooling water flowing through a water passage provided in the second regulator.

Specifically, to attain the first object, the fuel supply arrangement is provided with a regulator in the fuel piping connecting the gas fuel tank and the engine, and comprising a pressure sensor disposed upstream of the regulator, and means for stopping the supply of fuel when the pressure sensed by the pressure sensor is lower than a predetermined value.

The high pressure gas supplied from the gas fuel tank is regulated to a predetermined pressure by the regulator, and supplied to the engine. However, when the gas fuel level remaining in the tank becomes low, for example, original pressure in the tank decreases, the regulating capability of the regulator is degraded. Thus, the amount of gas supplied to the engine changes so that the air/fuel ratio is improperly regulated. Then, the pressure sensor is disposed upstream of the regulator to forcibly shut off supply of the fuel with the fuel supply stop means to stop the engine when the pressure sensed by the pressure sensor is below a predetermined value. Accordingly, a situation such as improper regulation of the air/fuel ratio due to improper regulation by the regulator can be avoided so that improper operation such as abnormal combustion can be avoided.

In addition, the present invention is a method for detecting an abnormal state in the fuel supply system in which a regulator is provided in the fuel piping connecting an gas fuel tank and an engine comprising the steps of detecting pressure in the fuel piping connecting the fuel tank and the engine, and determining that there is an abnormal state in the fuel supply system when the pressure is above a predetermined value and the change rate of pressure is above a fixed value.

When the original pressure decreases in the tank, the abnormal state sensing means utilizing the pressure sensor tends to cause erroneous sensing. Such erroneous sensing is particularly significant, for example, in a case where an abnormal state is recognized if the rate of change of pressure in the piping goes below a predetermined value. This is because, as the original pressure in the tank is decreasing, the flow velocity increases to increase the pressure loss at a throttle area in the orifice of the regulator or the like so that the abnormal state sensing means recognizes the pressure loss as the decrease of original pressure and determines it as the abnormal state even if there is no abnormal state in the piping system. Thus, the present invention does not determine it as an abnormal state when the pressure sensed by the pressure sensor goes below the predetermined value.

To attain the second object, the present invention is a fuel shut-off device for a vehicle, wherein a plurality of fuel shut-off valves and a plurality of pressure sensors are disposed between the gas fuel tank and the engine, the fuel shut-off valves being opened for a predetermined interval of time and then closed when an ignition system of the engine is energized, the pressure sensors monitoring the pressure in the piping to open the fuel shut-off valves at the moment when the start signal of the engine is confirmed.

After the fuel shut-off valves are once opened by energizing the ignition of engine, they are closed until the start signal of the engine is obtained, during which interval the fuel piping is completely closed and each pressure is checked. Therefore, complete closing of the piping enables it to detect even slight variation of pressure.

To attain the third object, the fuel system abnormal state sensing system for a gas fueled vehicle comprises means for accumulating the injection amount of fuel to a fuel injection gas engine, and means for estimating consumption of the fuel in the tank from the pressure and temperature in the fuel tank, whereby it is determined there is an abnormal state in the fuel system when the accumulated value and the consumption obtained by these means are exceeded.

That is, when the fuel consumption estimated at the tank is compared with the fuel injection amount accumulated at the engine, it is determined that there is no abnormal state if they match, and there is an abnormal state if the difference exceeds a predetermined value. Accordingly, since an abnormal state in the fuel system is determined by comparing both values, even a slight abnormal state can be detected so that the sensing accuracy is significantly improved.

To attain the fourth object, the present invention is a fuel supply control unit for electromagnetically opening or closing a fuel injection valve of a fuel injection device, the fuel supply control unit comprising basic data detection means for detecting basic data for calculating sticking force of the fuel injection valve, and control means for controlling a lift load for the fuel injection valve, the sticking force being calculated from the basic data detected by the basic data detection means, the control means controlling a peak current value of the fuel injection valve so that the lift load becomes larger than the sticking force. In addition, the control means is arranged to control a valve open time together with the peak current value.

In a case where the fuel injection valve is frozen because of a low temperature, the lift load is increased by increasing the peak current of the fuel injection valve. Since, when the sticking force of the fuel injection valve increases, injection ineffective time (ineffective time until the fuel injection valve actually opens after issuance of an instruction for opening the valve) is extended, the injection nozzle is completely lifted by increasing the lift load and extending the valve open time. Accordingly, it is possible to always supply the desired amount of fuel by controlling the valve open time as well. In this way, the engine can be smoothly started.

To attain the fifth object, the present invention is a regulator for a gas fuel engine comprising a water passage provided in a regulator for regulating the pressure of fuel gas for a water-cooled gas engine vehicle, cooling water circulated through the engine being caused to flow through the water passage, wherein a flow control valve is provided in the path for the cooling water to flow, the flow rate control valve being controlled according to the operation state of the vehicle.

The operation state of the vehicle is determined by temperature of the regulator, temperature of the engine cooling water, number of revolutions of the engine, intake pressure of the engine manifold, running speed of the vehicle, or a combination of them.

The regulator is maintained at a proper temperature by appropriately controlling the flow rate of cooling water introduced in the regulator depending on the operation state of the vehicle to improve the accuracy of regulation. In this case, the temperature of cooling water of the engine directly relates to the temperature of the regulator, and the number of revolutions of the engine relates to the temperature of the regulator through the variation of flow rate through the engine. In addition, the intake pressure of the manifold relates to the temperature of the regulator through difference of heat generation of the engine, and the running speed of the vehicle relates to the temperature of the regulator through difference of heat radiation of the cooling water. Then, it is arranged to hold the proper temperature of the regulator by one or a combination of these factors. Accordingly, it becomes possible to operate the regulator at the optimum state. Thus, the fuel can be accurately controlled, which contributes to extend the life of the regulator.

BRIEF DESCRIPTION OF THE DRAWINGS

The present invention will be described in detail with reference to the accompanying drawings, in which:

FIGS. 10A, 10B, and 10C are examples of the configuration of a processing flow when accumulating injection amount of fuel;

FIG. 14 is a diagram illustrating the difference of current waveforms when the lift load is increased and at a normal state;

FIG. 15 is an illustration schematically illustrating a control map for finding a valve open correction time;

FIGS. 16A, and 16B are illustrations of the sticking force of an injector valve, in which FIG. 16A is a partial view of an injector nozzle, and FIG. 16B is an illustration schematically illustrating a control map for finding the sticking force;

DETAILED DESCRIPTION OF THE INVENTION

Figure 1:
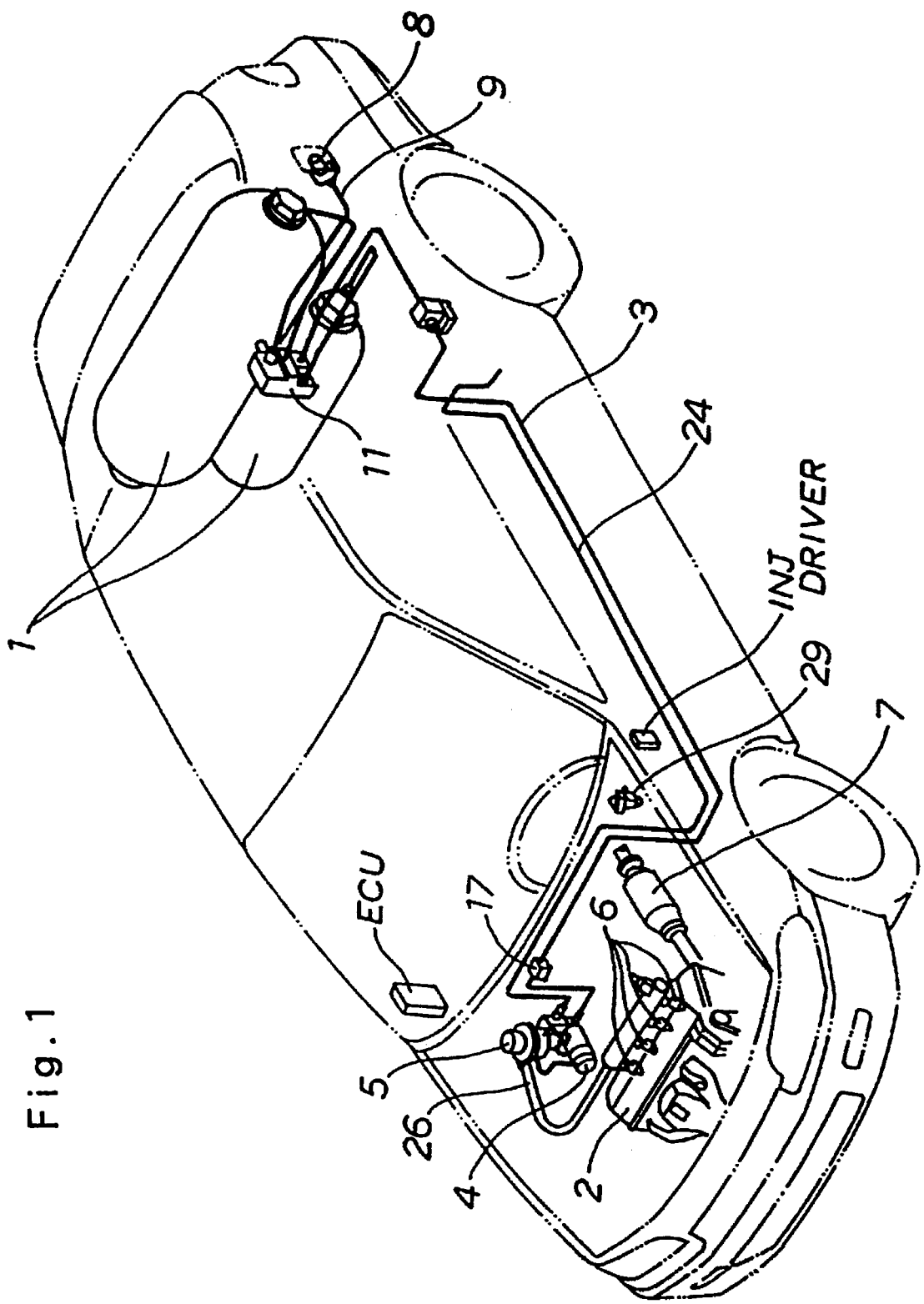
FIG. 1 is a schematic view of a fuel supply system according to the present invention mounted on a vehicle body.
Figure 2:
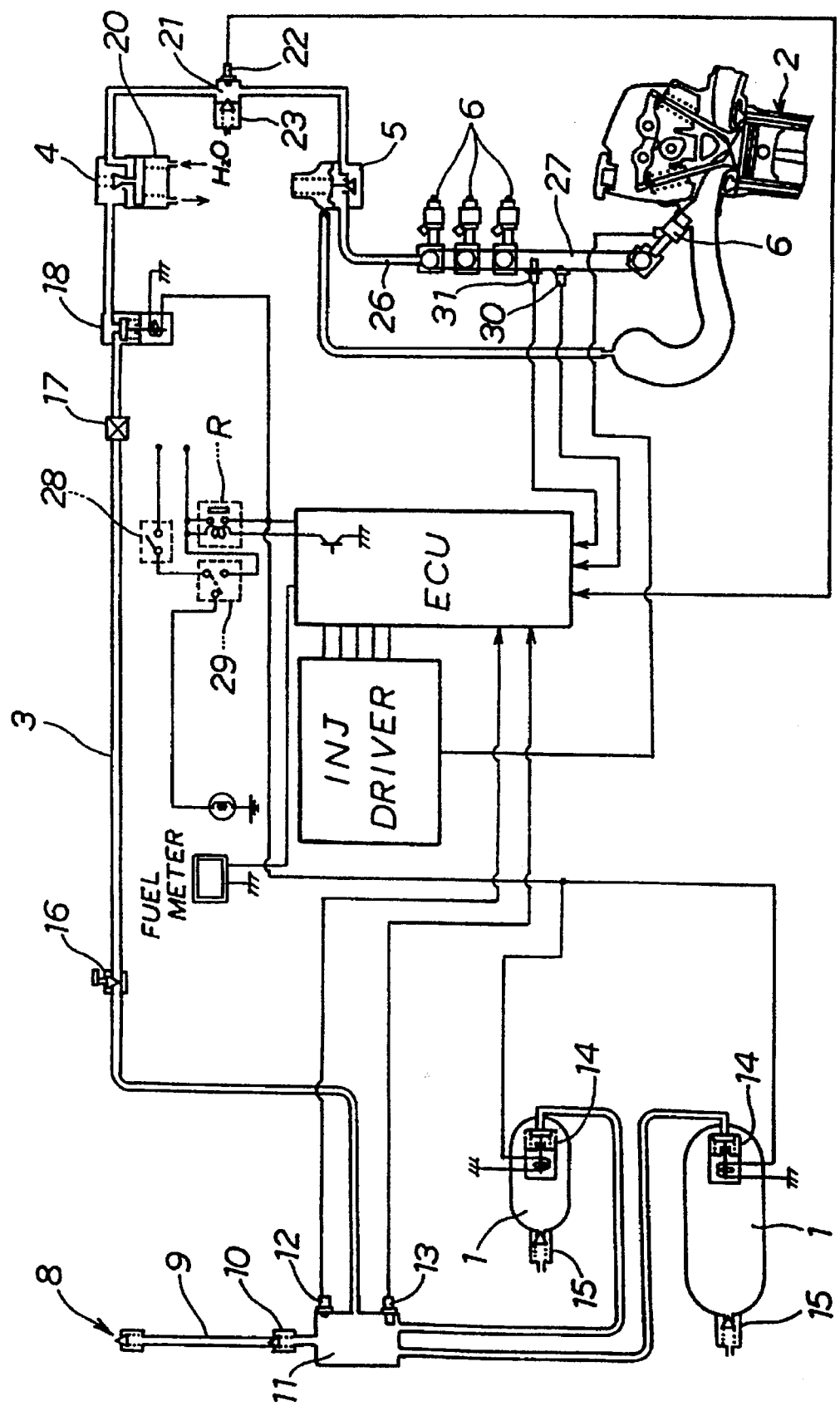
FIG. 2 is a schematic system diagram of a fuel supply system according to the present invention.
Figure 3:
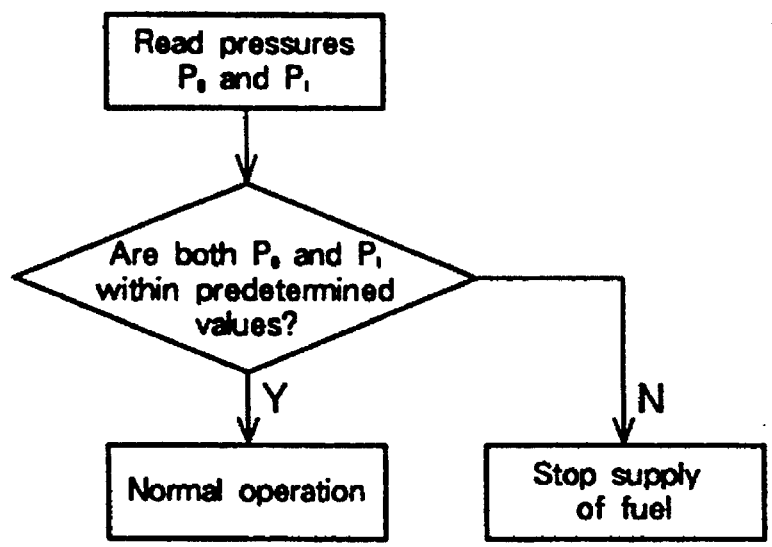
FIG. 3 is a flowchart of a first arrangement of a first embodiment of the present invention.

First, an outline of a fuel supply system for a gas engine vehicle is described by referring to FIGS. 1 and 2.

Two tanks 1 containing compressed natural gas (CNG) under high pressure, for example, of about 200 kg/cm$^2$ are disposed in the trunk area of a vehicle, and a water-cooled engine 2 is mounted at the front section of the vehicle.

A high pressure piping 3 for transferring forward the high pressure gas in the tank 1 is provided under the cabin at the middle section of the vehicle. Mounted in the engine room at the front of vehicle are a primary pressure regulator 4 as a regulator for regulating the gas transferred under the high pressure to about 7 kg/cm$^2$, and a secondary regulator 5 for further regulating the regulated gas to about 2 kg/cm$^2$ at gauge pressure.

The gas regulated by the secondary regulator 5 is injected into the combustion chamber of the engine through an injector 6, and exhausted through a catalyst convertor 7 in the exhaust gas system of the engine 2.

Now, referring to FIG. 2, the fuel supply system is described in detail. There are two tanks 1 in the embodiment. A tank piping 9 is mounted between the tanks 1, 1 and a fuel charging port 8. A check valve 10 is provided in the tank piping 9 to prevent a back flow of gas being charged, and a connection with the high pressure piping 3 is arranged downstream from it. This connection is arranged as a tank gas sensor 11.

The tank gas sensor 11 has a pressure sensor 12 and a temperature sensor 13. The pressure sensor 12 can measure the tank gas pressure $P_0$, and the temperature sensor 13 can measure the tank gas temperature $T_0$.

A first electromagnetic shut-off valve 14 is provided at the inlet of each tank 1. The first electromagnetic shut-off valve 14 can be controlled for opening and closing with an electronic control unit (ECU) (microcomputer for control). A relief valve 15 is mounted at the opposite side of each tank 1.

Provided upstream in the high pressure piping 3 is a manual valve 16 which can be manually controlled for opening and closing. A filter 17 is provided downstream. A second electromagnetic valve 18 is mounted between the filter 17 and the primary pressure regulator 4 so that the second electromagnetic valve 18 can be controlled for opening and closing by the ECU.

The primary pressure regulator 4 has a water conduit 20 through which the cooling water circulated through the engine 2 is caused to flow so as to heat the primary pressure regulator 4 which is quenched by adiabatic expansion in decompression.

The primary pressure regulator 4 has in its downstream a primary gas sensor 21 which is then provided with a primary pressure sensor 22 to be able to sense the primary gas pressure $P_1$, and a relief valve 23. The relief valve 23 connects to a relief piping 24 (FIG. 1) to extend it rearward to the vehicle.

The primary gas sensor 21 has in its downstream the secondary pressure regulator 5 which regulates the gas fuel finally supplied to the engine to a required pressure.

The gas accurately regulated by the secondary pressure regulator 5 is fed to a gas chamber 27 through a low pressure piping 26, and injected into the engine 2 through the injector 6.

The exhaust gas is processed by the catalyst convertor 7 dedicated for CNG, and released into the air.

Figure 12:
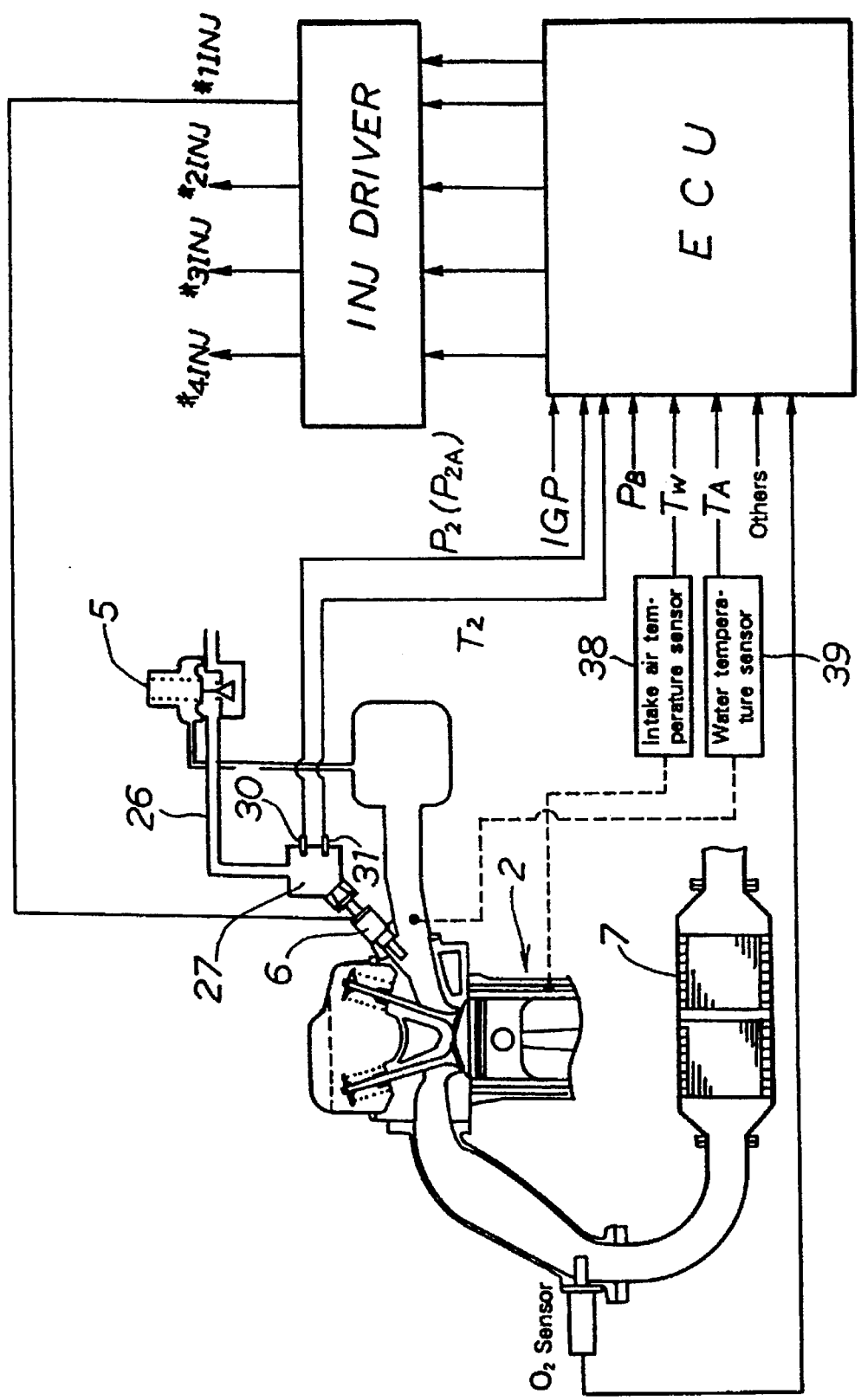
FIG. 12 is an arrangement of a fuel injection control system according to a fourth embodiment of the present invention.

Provided in the gas chamber 27 are a secondary pressure sensor 30 for sensing the secondary gas pressure $P_2$ and a secondary temperature sensor 31 for sensing the secondary gas temperature T2. A signal sensed by these sensors 30 and 31 is supplied to the ECU for controlling the fuel injection. The ECU is designed to receive various engine data and the like from other sensors such as a water temperature sensor 38 for detecting water temperature of the engine $T_W$, and an intake air temperature sensor 39 for detecting intake air temperature $T_A$ as shown in FIG. 12, and controls a valve of the injector 6 by driving an injection driver (INJ DRIVER) while taking such data into account so that a predetermined amount of fuel injection can be obtained. $P_B$ represents negative pressure in the downstream to the fuel supply unit.

Mounted below the steering wheel in the cabin is an inertia switch 29 functioning as an impact sensor activated at a predetermined amount of impact (G). The inertia switch 29 is connected to the ECU, the first electromagnetic shut-off valve 14, and the second electromagnetic shut-off valve 18 through an ignition switch 28, and a normally open relay R.

When the ignition switch 28 is turned on and the inertia switch 29 is turned on (normal state), the normally open relay R is closed to cause current to flow through the first and second electromagnetic shut-off valves 14 and 18 so that they are opened. When either one of the ignition switch 28 or the inertia switch 29 is turned off, the first and second electromagnetic shut-off valves 14 and 18 are closed.

Figure 5:
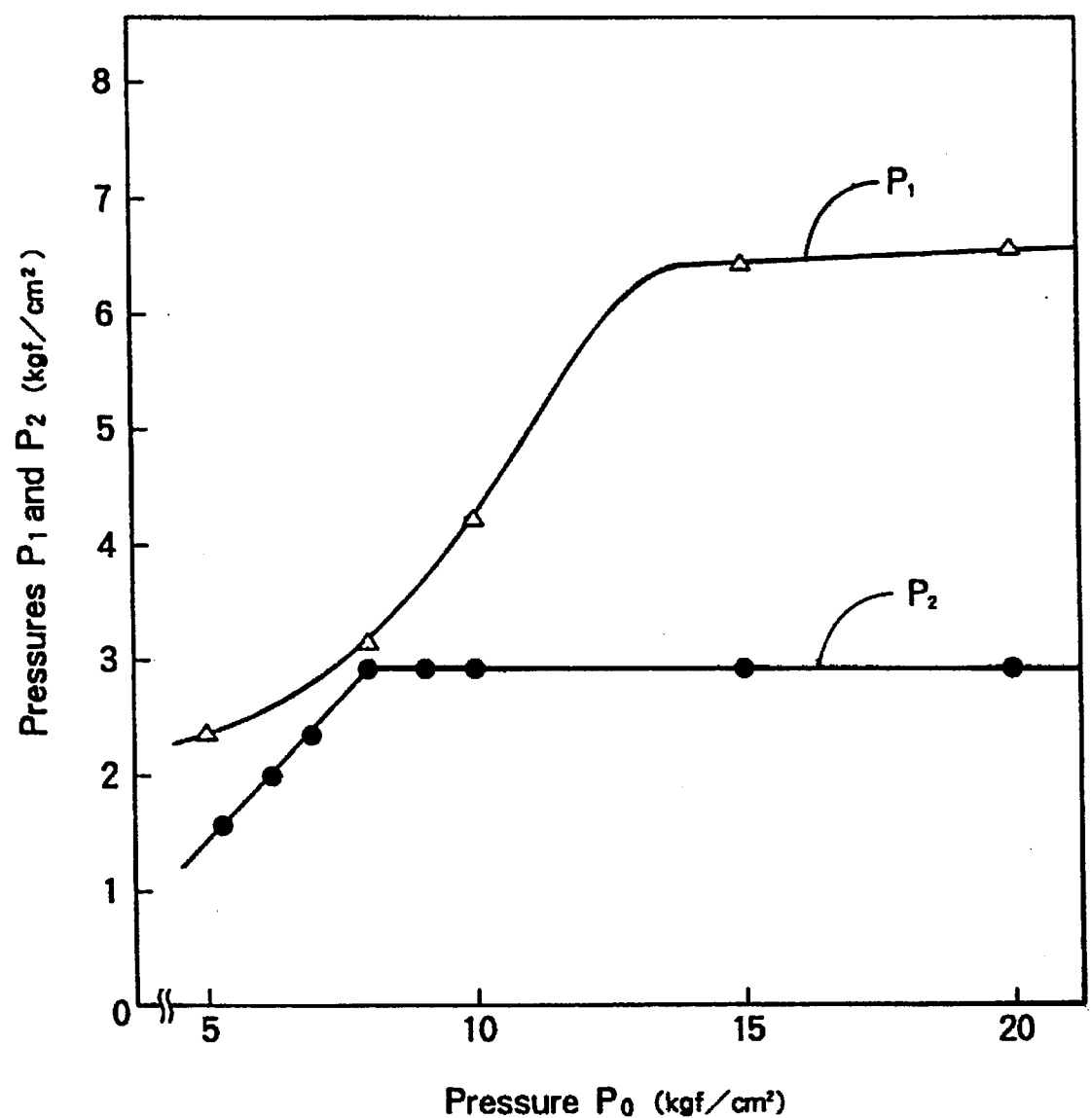
FIG. 5 is characteristic curves illustrating one example of fuel pressure change in a fuel supply piping according to the first embodiment.

Although, as described, the tank gas pressure $P_0$ sensed by the pressure sensor 12, the primary gas pressure $P_1$ sensed by the primary pressure sensor 22, and the secondary gas pressure $P_2$ sensed by the secondary pressure sensor 30 are supplied to the ECU, reference values of the tank gas pressure $P_0$, the primary gas pressure $P_1$ and the secondary gas pressure $P_2$ vary according to the amount of fuel remaining in the tank 1 as shown, for example, in FIG. 5. FIG. 5 shows characteristic curves of variation of the tank gas pressure $P_0$, the primary gas pressure $P_1$, and the secondary gas pressure $P_2$, in which the axis of abscissa represents the pressure scale of the tank gas pressure $P_0$ (kgf/cm$^2$), and the axis of ordinate represents the gauge pressure scale of the primary and secondary gas pressure $P_1$ and $P_2$ (kgf/cm$^2$).

As seen from the characteristic curves for pressure variation, the tank pressure $P_0$, originally at about 200 kg/cm$^2$, decreases as the remaining fuel becomes low. It can be seen that, when the tank gas pressure $P_0$ becomes 10 kgf/cm$^2$ or less, the primary gas pressure $P_0$ to be decompressed to about 7 kg/cm$^2$ becomes suddenly unstable. This indicates the limit of the primary pressure regulator 4.

In addition, it can be also seen that, when the primary gas pressure $P_1$ becomes 3–4 kg/cm$^2$ or less, the secondary gas pressure $P_2$ becomes suddenly unstable. This indicates the limit of the secondary pressure regulator 5.

Therefore, if the pressure regulators 4 and 5 are operated at the above-mentioned limits or less, they cannot regulate the pressure to the desired values so that improperly regulated gas is ultimately supplied to the engine 2, the air/fuel ratio is disturbed, and normal combustion cannot be attained.

Then, the first arrangement according to the first embodiment of the present invention stops the supply of fuel to the engine 2 by shutting off the electromagnetic shut-off valves 14 and 18 with the ECU when either the tank gas pressure $P_0$ or the primary gas pressure $P_1$ is at the predetermined value or less. In this embodiment, the tank gas pressure $P_0$ and the primary gas pressure $P_1$ are monitored by pressure regulators and 5 so that the supply of fuel is shut off at $P_0 \leq 13$ kgf/cm$^2$ and $P_1 7$ kgf/cm$^2$, respectively.

Instead of making the determination with respect to both the tank gas pressure $P_0$ and the primary gas pressure determination may be made using only either one of them. In addition, the secondary gas pressure $P_2$ may be included in making the determination. In this case, the reference value for the secondary gas pressure $P_2$ should preferably be about $P_2 \leq 2$ kgf/cm$^2$ which does not cause dispersion in the amount of fuel injected through the injector 6 when the engine is fully opened.

Figure 4:
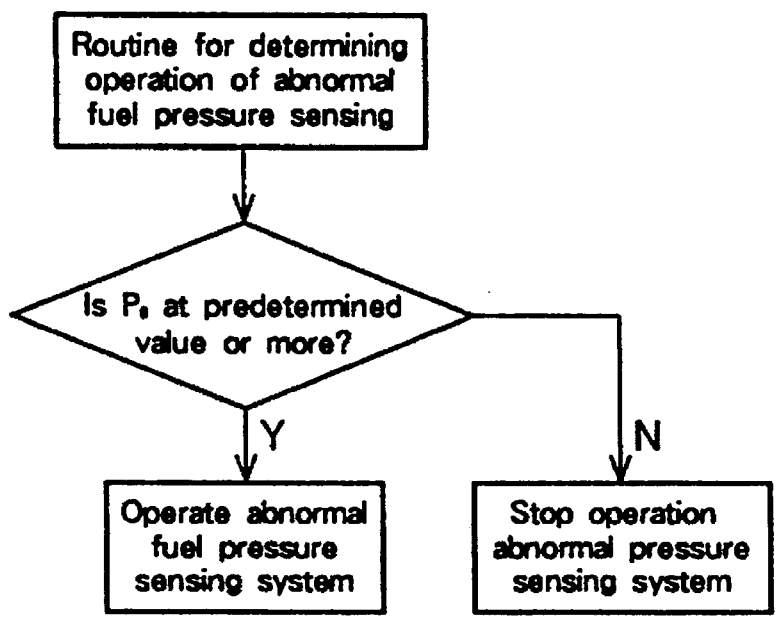
FIG. 4 is a flowchart of a second arrangement.

Now, the second arrangement according to the first embodiment is described by referring to the flowchart of FIG. 4.

In this arrangement, there is provided abnormal state sensing means for sensing any abnormal state in the high pressure piping 3. The abnormal state sensing means is designed to generate an abnormal signal when pressure reduction of the tank gas pressure $P_0$ sensed by the pressure sensor 12 within a unit time (change ratio of pressure) exceeds a predetermined value. This abnormal signal is indicated by, for example, a warning lamp.

However, as the tank gas pressure $P_0$ decreases, the flow velocity of the fuel increases to cause pressure loss in the orifice of the first electromagnetic valve 14 or the like so that the amount of reduction of the tank gas pressure $P_0$ may exceed the predetermined value. In such case, although there is no abnormal state in the piping system, an abnormal signal is generated and the warning lamp or the like is energized.

Then, the second arrangement is designed to stop the operation of the abnormal state sensing means when the pressure reduces to a level causing the abnormal state sensing means to make an error. In other words, in this arrangement it is determined that there is an abnormal state when the tank gas pressure $P_0$ is at a predetermined value or more, and the change ratio of pressure is at a certain value or more. If the tank gas pressure $P_0$ is less than the predetermined value, the abnormal state sensing means is stopped for its operation. The tank gas pressure $P_0$ to stop operation may be $P_0 \leq 10$ kgf/cm$^2$.

With such arrangement, useless anxiety to the user caused by an erroneous warning of an abnormal state is avoided.

It may be possible to combine and use both the pressure which is the reference of the first arrangement for shutting off the fuel, and the reference pressure of the second arrangement for stopping the operation of the abnormal state sensing means.

Figure 6:
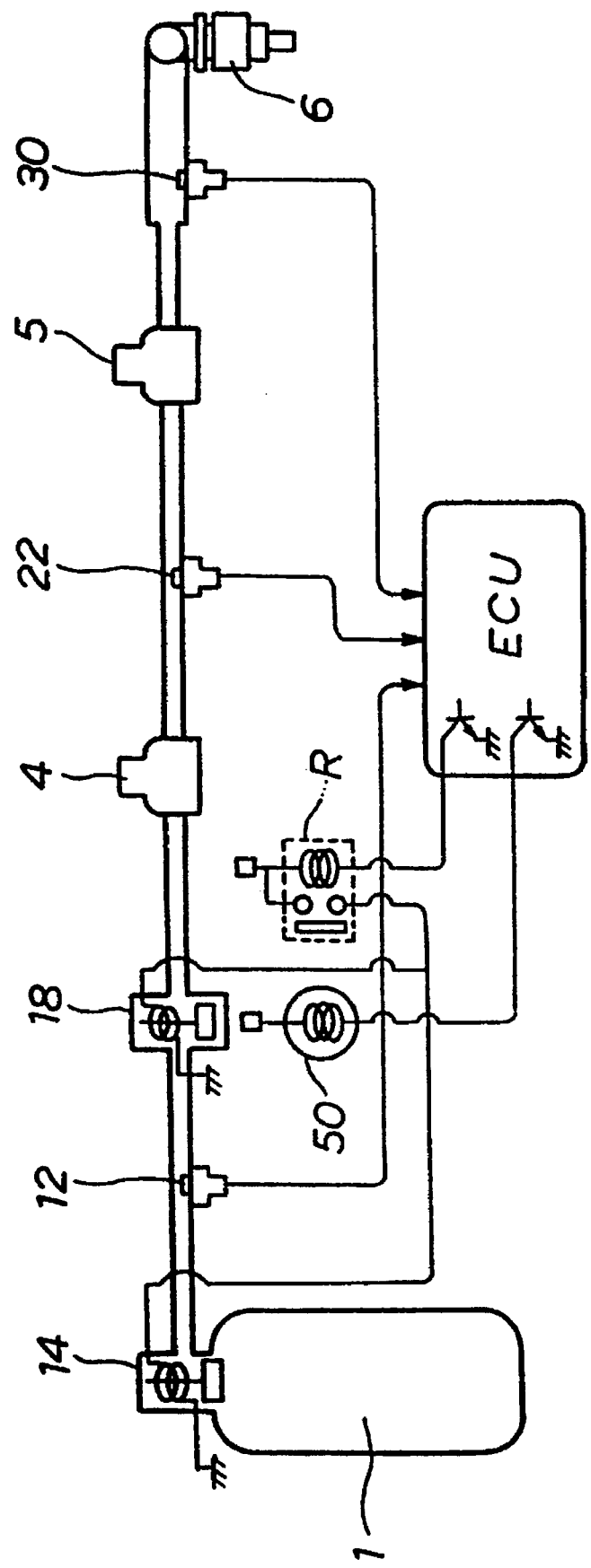
FIG. 6 is an arrangement of circuit for controlling each electromagnetic valve.

FIG. 6 is a simplified diagram of the fuel supply system shown in FIGS. 1 and 2. In FIG. 6, the reference numeral 50 designates a fuel pressure warning indicator. If there is any abnormal state in the tank gas pressure $P_0$, the primary gas pressure $P_1$, and the secondary gas pressure $P_2$ sensed by the pressure sensor 12, the primary pressure sensor 22, and the secondary pressure sensor 30, warning is issued by turning on the fuel pressure warning indicator 50.

Figure 7:
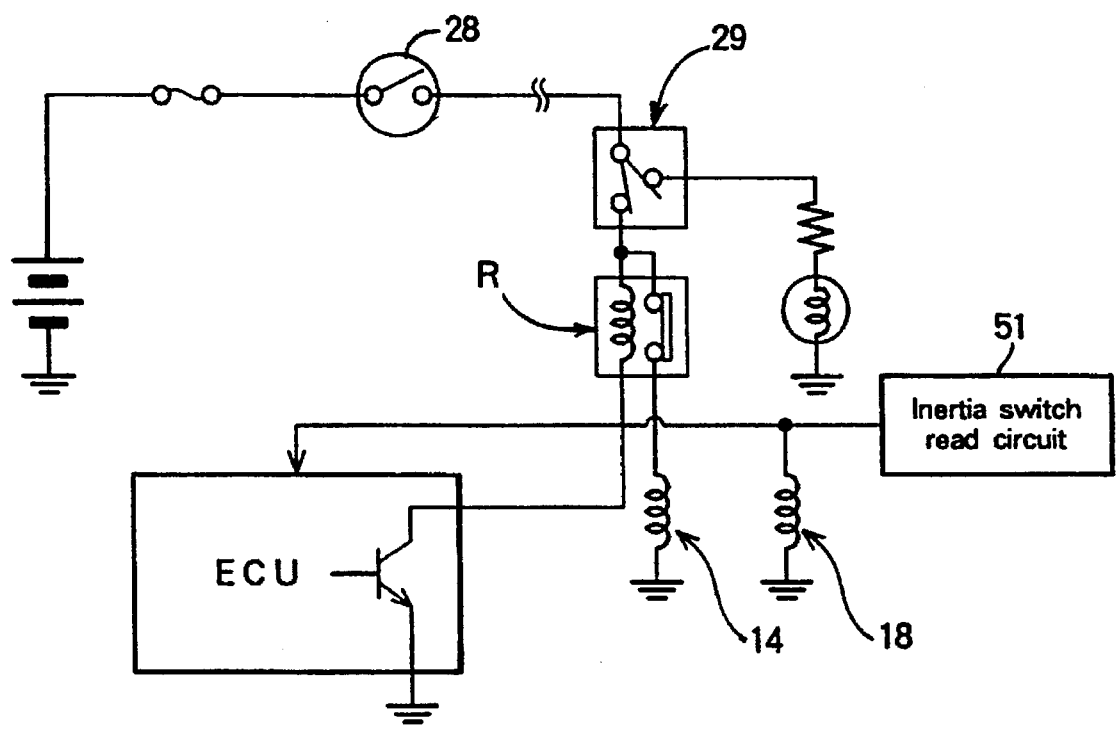
FIG. 7 is a simplified diagram of a fuel supply system.

FIG. 7 is a circuit configuration for controlling the first and second electromagnetic valves 14 and 18. When the ignition switch 28 and the inertia switch 29 are turned on to energize the coil of the normally open relay R, the relay R is closed to supply current through the electromagnetic valves 14 and 18 so that they are opened.

Figure 8:
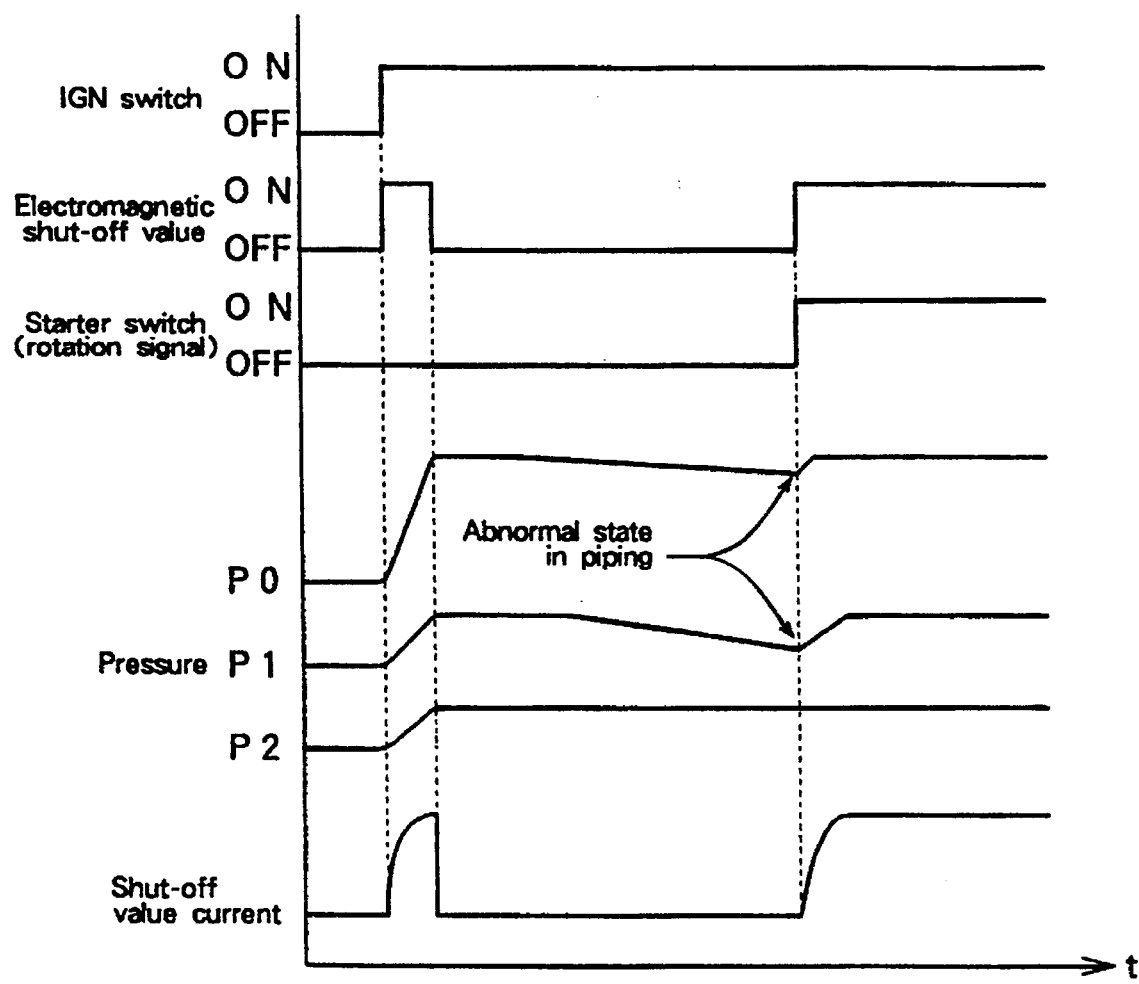
FIG. 8 is a graph illustrating the operation of a fuel shut-off device which is a second embodiment of the present invention, in which the upper three rows show changes of state of an ignition switch, electromagnetic valves, and starter signals (starter switch and revolution signal (crank pulse)) as time passes, respectively, the middle three rows show an example of changes of state of tank gas pressure $P_0$, primary gas pressure $P_1$, and secondary gas pressure $P_2$, respectively, and the lower row shows change of state of current value to each shut-off valve.

Now, the operation of the fuel shut-off device according to the second embodiment of the present invention is described by referring to FIG. 8.

In FIG. 8, the upper three rows show changes of state of the ignition switch 28, the electromagnetic valves 14 and 18, and the starter signals (starter switch and revolution signal (crank pulse)) as time passes, respectively; the middle three rows show an example of changes of state of the tank gas pressure $P_0$, the primary gas pressure $P_1$, and the secondary gas pressure $P_2$, respectively; and the lower row shows change of the state of current value to each shut-off valve.

As seen from FIG. 8, in this embodiment, when the ignition switch 28 is turned on, current is caused to flow through the electromagnetic valves 14 and 18 for a predetermined interval of time to open them, and then the normally open relay R is closed under the control of ECU to stop supply of current to the electromagnetic valves 14 and 18 to close them.

Closing of the electromagnetic valves 14 and 18 continues until the starter is turned on and the rotation signal (crank pulse) is sensed. For example, assuming that timing is about two seconds to open the electromagnetic valves 14 and 18 when the ignition switch 28 is turned on, the electromagnetic valves 14 and 18 are kept closed for about 60 seconds until the rotation signal is subsequently obtained. While the electromagnetic valves 14 and 18 are closed, the tank gas pressure $P_0$, the primary gas pressure $P_1$, and the secondary gas pressure $P_2$ are monitored by the pressure sensor 12, the primary pressure sensor 22, and the secondary pressure sensor 30.

Now, it is assumed that the tank gas pressure $P_0$, the primary gas pressure $P_1$, and the secondary gas pressure $P_2$ exhibit the changes shown in FIG. 8. It is found that there is an abnormal state in the line for the primary gas pressure and that there is no abnormal state in the line for the secondary gas pressure $P_2$. In this case, because a closed state is attained by closing the electromagnetic valves 14 and 18, even slight pressure variation can be sensed. Such pressure variation may be known by the fuel pressure warning indicator.

Consumption of current from the battery can be reduced by once interrupting power supply to the electromagnetic valves 14 and 18 so that it can contribute to saving of power consumption.

Alternatively, in a case where the tank gas pressure $P_0$, the primary gas pressure $P_1$, and the secondary gas pressure $P_2$ exceed a predetermined pressure (for example, a pressure sufficient to start the engine), the electromagnetic valves 14 and 18 may not be opened when the ignition switch 28 is turned on, and they may be opened only when the start signal is detected.

In such case, it is possible to prevent noise which is generated when the electromagnetic valves 14 and 18 are operated from a closed state to an open state. (Conventionally, because, when the electromagnetic valves 14 and 18 are operated from a closed state to an open state, a big noise is generated, measures such as a noise insulating material is provided around the engine.) Even in such situation, the fuel pressure is monitored by the pressure sensors until the start signal is detected.

This second embodiment is designed not to provide the sensing circuit on the inertia switch 29 itself for sensing its on or off state, but to know the state of the inertia switch 29 when the operation of the electromagnetic valves 14 and 18 is initiated. That is, as shown in FIG. 7, there is provided an inertia switch read circuit S1 which can read the voltage of the electromagnetic valves 14 and 18 to recognize that the inertia switch 29 is on if, for example, the read voltage is at H state such as about 5 V, and that it is off if the voltage is at L state such as 0 V. Recognition of the state of inertia switch 29 can be attained by the fact that the electromagnetic valves 14 and 18 are closed when the inertia switch 29 is off so that the supply of fuel is shut off from the tank or piping to the engine. Then, since there may arise such situation where the fuel cannot be supplied in an amount sufficient for combustion in the cylinder even if injection is performed, the fuel is shut off to protect the catalyst convertor 7 and the like.

Such inertia switch read circuit 51 simplifies the configuration of the second embodiment by recognizing the state of inertia switch 29.

Figure 9:
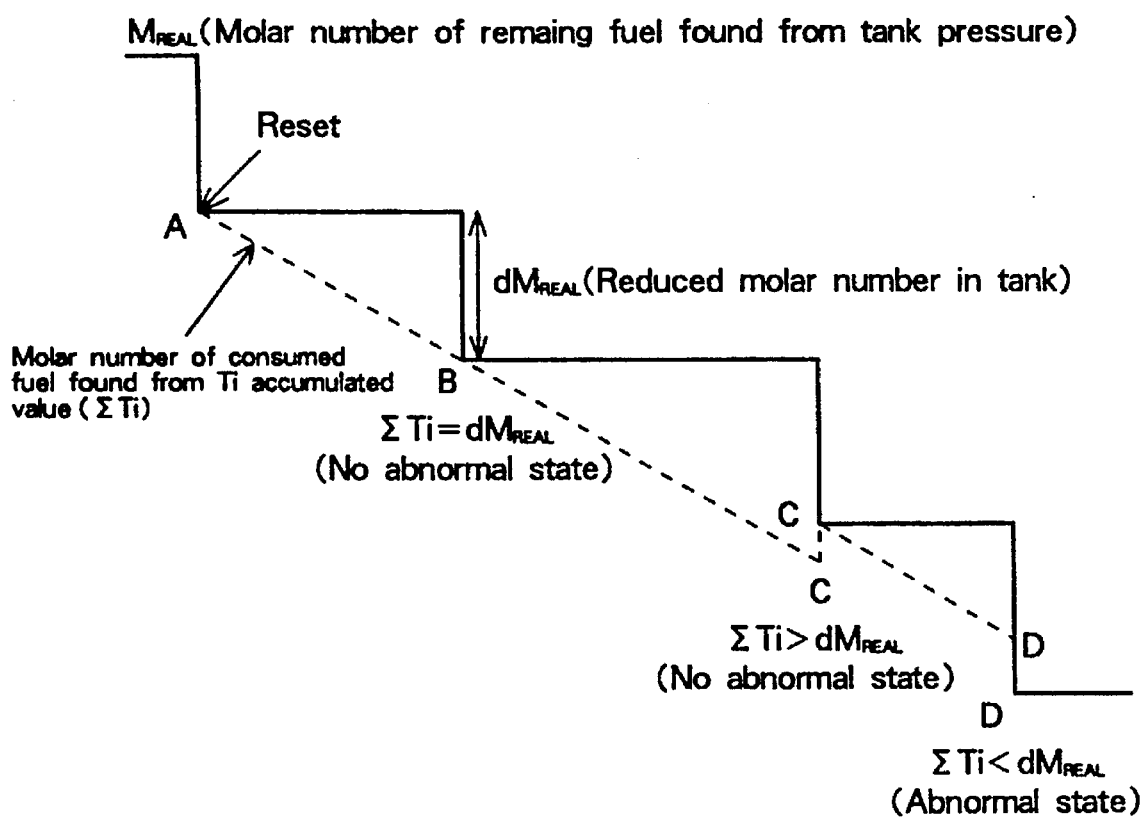
FIG. 9 is a diagram schematically illustrating the sensing procedure of a fuel system abnormal state sensing system which is a third embodiment of the present invention.

Now, the fuel system abnormal state sensing system according to the third embodiment of the present invention is described by referring to FIGS. 9 and 10A–10C. FIG. 9 is a diagram schematically illustrating the sensing procedure of a fuel system abnormal state sensing system, while FIG. 10A–10C are examples of a configuration of a processing flow when accumulating injection amount of fuel.

In the fuel supply system described for FIGS. 1 and 2, the fuel system abnormal state sensing system of the embodiment finds an accumulated value of fuel injected from the injector, and also finds the fuel remaining in the tank 1 by a predetermined interval of time from the tank gas pressure $P_0$ sensed by the pressure sensor 12 and the temperature sensor 13 of the tank gas sensor 11, as well as the tank gas temperature $T_0$. Then, the fuel consumption in a predetermined interval of time at the tank 1 is estimated. The fuel consumption at the tank 1 is compared with the accumulated value of fuel injected from the injector 6.

Here, an example of procedure for accumulating the amount of injected fuel from the injector is described by referring to FIG. 10A–10C.

An electrical signal for opening the valve is fed to the injector 6 from the ECU. Then, the electromagnetic coil is energized while the signal is fed (valve open time Ti) to open the injector valve for fuel injection. The amount of fuel injected from each injector 6 is determined by accumulating the valve open time (Ti) of the injectors 6. In the embodiment, the valve open time (Ti) is accumulated for all four injectors 6. The valve open time (Ti) instructed by the ECU is corrected for the secondary gas pressure $P_2$ and the secondary gas temperature $T_2$.

However, it is necessary for the valve open time (Ti) for the injector 6 to take into account a transient time until the valve is set at the predetermined position since the open valve signal is first supplied (injector ineffective time). That is, the accumulated value TiSUM is found by subtracting the amount of fuel TiVBP corresponding to the injector ineffective time from the amount of fuel TOUTN corresponding to the duration when the electrical signal actually flows (FIG. 10A).

In addition, processing as shown in FIG. 10B is provided for correcting the fuel injected from the injector 6 for the pressure, temperature, and variation in design. In this case, the calculation is accurately conducted by converting and processing the amount of fuel into the molar number of gas. That is, Ti1MOL at the reference pressure and reference temperature (a reference number of 1 mol of fuel injected from the injector) is found from Ti-Q characteristics representing the relationship between the valve open time (Ti) of the injector 6 and the fuel flow rate (Q). A fuel pressure correction factor KRF and a fuel temperature correction factor KTF are found from the secondary gas pressure $P_2$ and the secondary gas temperature $T_2$ sensed by the secondary pressure sensor 30 and the secondary temperature sensor 31. Ti1MOL is corrected by these fuel pressure correction factor KRF and fuel temperature correction factor KTF, and also by a design deviation correction factor KDS. That is, Ti1MOL finally corrected becomes the reference of one mol of fuel injected from the applicable injector 6.

The amount of fuel injected from the respective injectors 6 is found in the molar number through the processing as shown in FIG. 10C based on the accumulated value TiSUM and the one molar reference value Ti1MOL as described above. That is, the processing determines by, for example, a 10 ms timer whether or not the accumulated value TiSUM reaches the one molar reference value Ti1MOL in every 10 ms. If so, one mol is added. Otherwise, that amount is transferred to the next time, and similar determination is repeated to accumulate the molar number accumulated value Ti1MC. While the embodiment employs multi-stage count for counting minute amount, one stage counter may be employed if the CPU is a high performance one. The molar number accumulated value Ti1MC thus found is indicated by broken lines in FIG. 9.

The gas fuel in the tank 1 reduces its pressure as the remaining amount decreases. There is correlation between the pressure and the remaining amount. Therefore, the remaining fuel can be determined by measuring the tank gas pressure $P_0$, and can be more accurately determined by correcting it with the tank gas temperature $T_0$. For example, if the remaining fuel is measured by every several ten milliseconds in molar number ($M_{REAL}$) to determine the difference in a predetermined interval of time ($dM_{REAL}$), this difference becomes the fuel consumption in such interval of time. The molar consumption $dM_{REAL}$ thus obtained is indicated by solid lines in FIG. 9.

Then, they are compared as shown in FIG. 9. FIG. 9 shows a model example of the molar consumption estimated at the tank 1 (solid lines) and the molar number accumulated value Ti1MC accumulated at the injector 6 (broken lines). For example, when the process is reset to match the Ti accumulated value (broken lines) with the remaining fuel in the tank (solid lines) at point A, there is no abnormal state in the fuel system if the accumulated value ΣTi and the molar consumption $dM_{REAL}$ match at point B. In addition, even if the accumulated value ΣTi at point C is larger than the molar consumption $dM_{REAL}$ at point C' to cause a difference between them, it is determined to be no abnormal state if the difference is within a predetermined value. In the case where such a difference occurs, the system is reset after determination to match the start point for measuring the next accumulated value ΣTi at the molar consumption $dM_{REAL}$.

Then, if the accumulated value ΣTi at point D becomes less than the molar consumption $dM_{REAL}$ at point D', and the difference between them exceeds a predetermined value, it is determined that there is an abnormal state, and a warning is produced by, for example, a warning indicator.

When such abnormal state sensing processing method is employed, a conventional pressure sensor cannot sense an abnormal state in the fuel system unless the pressure variation in the piping is about 9 LSB (15.38 kgf/cm$^2$) or higher. In contrast, according to the procedure of this embodiment, even a pressure difference of about ¼LSB (0.427 kgf/cm$^2$) can be sensed.

In addition, this embodiment is arranged to stop the operation of the abnormal sensing system when a failure occurs in the injector 6, or when a failure occurs in respective pressure sensors 12, temperature sensors 13 or the like, or when the engine stops, or to invalidate or stop sensing to prevent erroneous sensing when the tank gas pressure $P_0$ becomes a predetermined value or less, when a load change (dPB) is large, or when the reduction rate of the tank gas pressure exceeds a predetermined value.

Figure 11A:
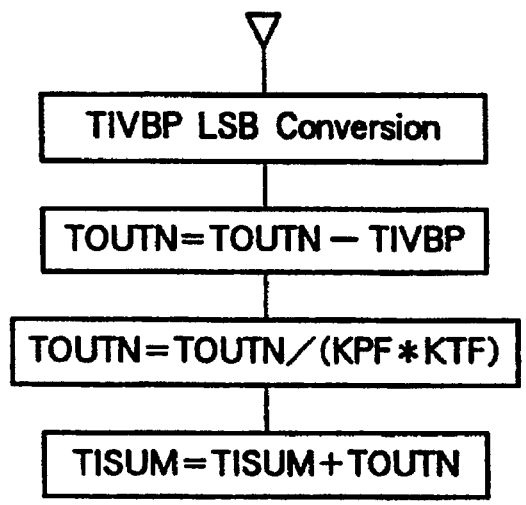
FIGS. 11A, 11B and 11C are examples of the configuration of another processing flow when accumulating injection amount of fuel.
Figure 11B:
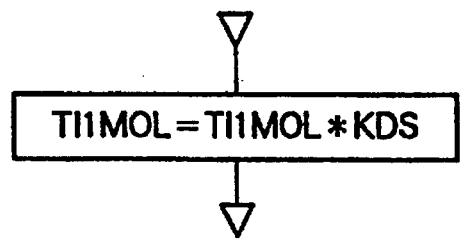
Figure 11C:
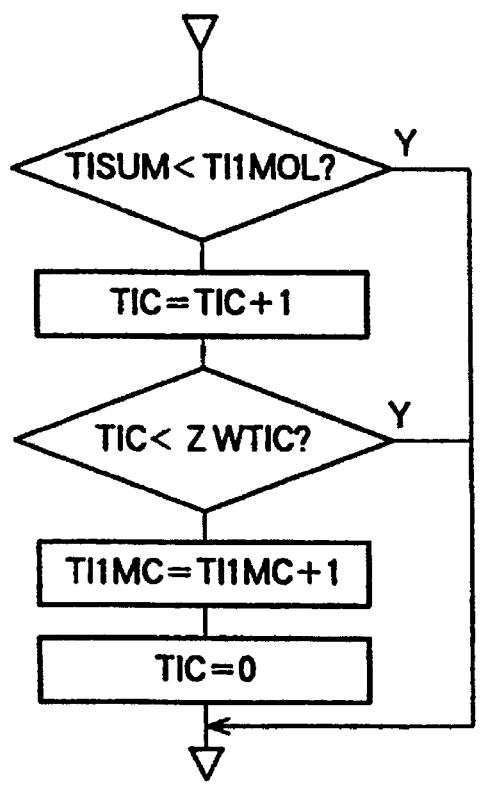

FIG. 11A–11C show a process flow of an arrangement which employs a value not corrected for the pressure and temperature in calculating Ti instead of the Ti1MOL reference value corrected for the pressure and temperature. That is, in the process flow for finding the Ti accumulated value shown in FIG. 11A, recorrection is conducted with the fuel pressure correction factor KPF and the fuel temperature correction factor KTF to invalidate the pressure and temperature conditions which have been corrected, and the Ti1MOL reference value is corrected only by the design deviation correction factor KDS in the process flow of FIG. 11B.

Then, the same results can be obtained by the procedure of FIG. 11C as in FIG. 10C. In FIGS. 11A–C abbreviations or the like used in the process flow have similar meaning as indicated for FIG. 10A–C.

Figure 13:
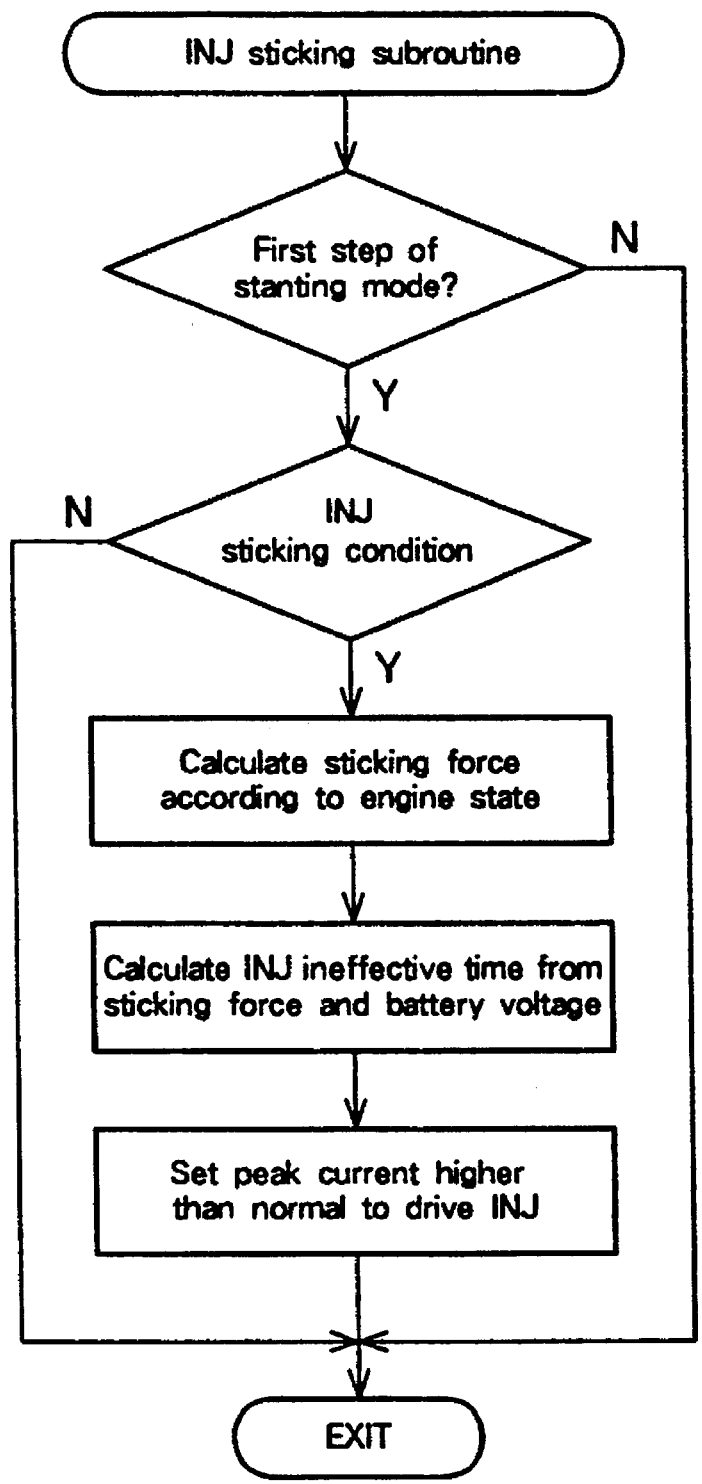
FIG. 13 is a flowchart illustrating a control flow of a fuel supply control unit according to a fourth embodiment of the present invention.

Now, the method for controlling the fuel supply control unit which is a fourth embodiment of the present invention is described by referring to FIGS. 13 and 16A–B. FIG. 13 is a control flowchart for the fuel supply control unit of the embodiment of the present invention, FIG. 14 is a diagram illustrating the difference of current waveforms when the lift load is increased, and FIGS. 15 and 16 are illustrations schematically illustrating a control map.

In the fuel supply unit shown in FIGS. 1, 2 and 12, particularly at a low temperature, such phenomena where the contact area between the injector nozzle 6a and the injector valve 6b as shown in FIG. 16A sticks because of freezing of water in methane gas contained in the fuel or freezing of water generated during combustion occurs so that the injector valve 6b fails to operate normally even if it is attempted by supplying current through the electromagnetic coil. Thus, this embodiment employs control by a subroutine as shown in FIG. 13 in the early stage in starting the engine 2 when it is not warmed up.

That is, the first step of the starting mode determines whether or not the injection valve is at the sticking condition. When it is determined that it is the first start of the engine, and at a sticking condition, the subroutine shown in FIG. 13 is executed. The sticking condition is determined to exist if any one of the following three temperature conditions is satisfied. (1) The water temperature of engine $T_W \leq 5°$ C., (2) the inlet air temperature $T_A \leq -5°$ C., or (3) the secondary gas temperature $T_2 \leq -5°$ C.

At the second step or later in the starting mode, freezing of the injection valve is released so that this subroutine is not employed as shown in FIG. 13.

In FIG. 13, if the sticking condition is satisfied, the sticking force is calculated depending on the state of the engine. Employed as the basic data for calculating the sticking force in this embodiment are the water temperature of engine $T_W$, the intake air temperature $T_A$, and the secondary gas temperature $T_2$, as well as an absolute pressure $P_{2A}$ (=$P_2$) in a space H in the upstream to the injector shown in FIG. 16A. In addition, the sensors for detecting these data are arranged as detection means for the basic data. A map is previously created for calculating the sticking force based on respective data values. The sticking force is found by collating respective data to the map. That is, the map is substantially arranged to have a higher sticking force as temperature $T_W$, $T_A$ or $T_2$ is lower, and the absolute pressure $P_{2A}$ is higher as shown in FIG. 16B.

Then, the injection ineffective time (ineffective time until the fuel injection valve is actually opened after the open valve signal is issued) is found from the sticking force and a battery voltage $V_B$, to calculate the valve open time. In this case also, a map is previously created for calculating the injection ineffective time based on the sticking force and the battery voltage $V_B$. The injection ineffective time and the valve open time corrected for the injection ineffective time are found by collating the sticking force to the map. That is, the map is substantially arranged to provide a shorter corrected valve open time (injection ineffective time) as the sticking force is lower, and the battery voltage $V_B$ is higher, as shown in FIG. 15.

In addition, at the same time, to operate the injection valve 6b, the peak current of the electromagnetic coil is set to a value higher than a normal one to increase the lift load of the injection valve 6b. This lift load is designed to be higher than the sticking force. This embodiment previously estimates the maximum value of sticking force due to freezing, and establishes and supplies a peak current providing a lift load higher than the maximum value (for example, if the current at normal state is 2 A, about 5 A is supplied). As an example, FIG. 14 shows the current waveform when the injector sticks when compared with the normal state.

In the fuel supply control unit arranged as above, it is possible to avoid such inconvenience that the fuel is not supplied to the engine and the engine cannot be started because the lift load is increased for the injection valve 6b even if the injector 6 is frozen. In addition, a desired amount of fuel can be always supplied because the valve open time is extended by correcting the injection ineffective time.

Figure 17:
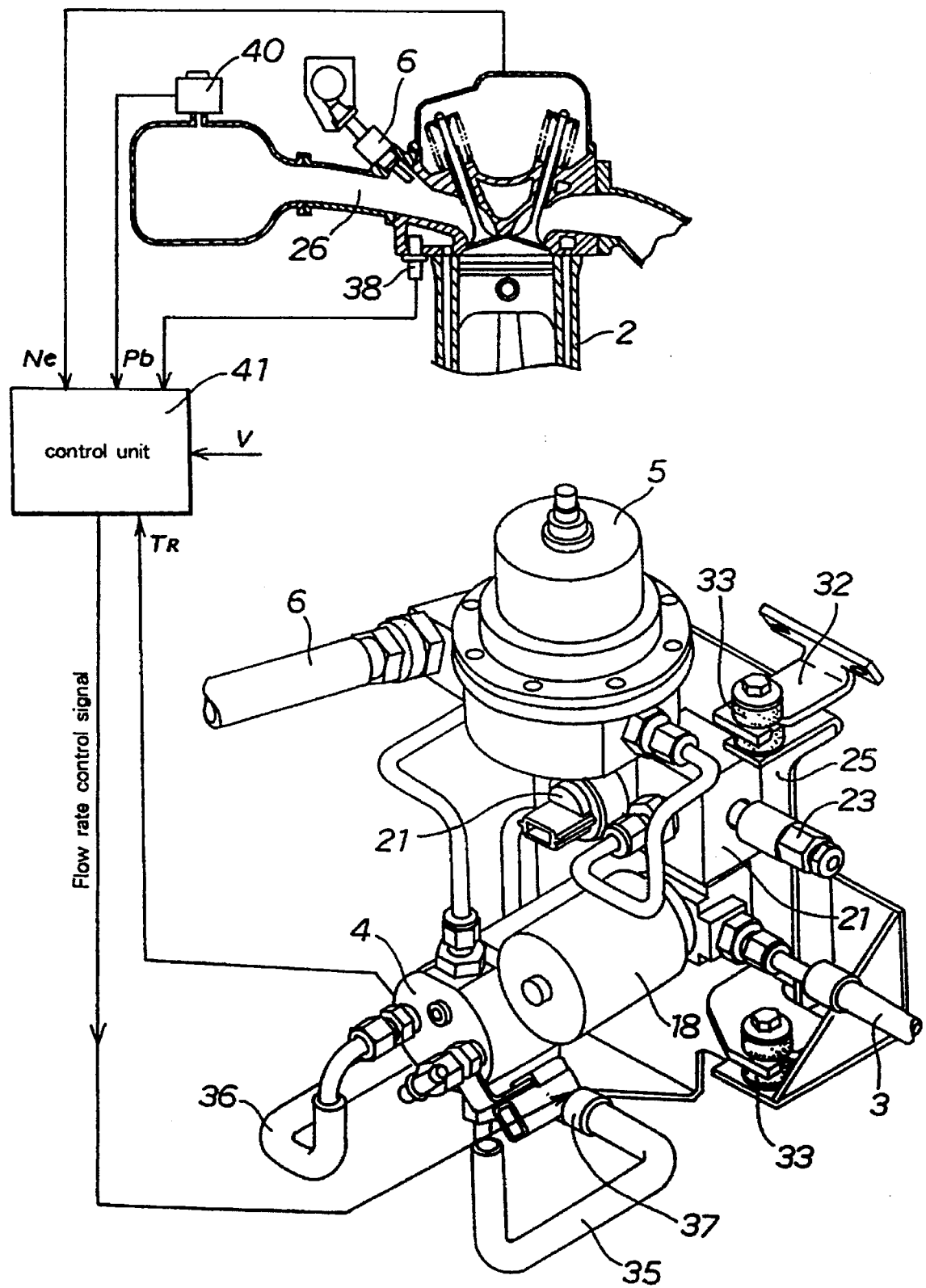
FIG. 17 is an illustration illustrating an input signal or the like for controlling a flow rate control valve according to a regulator which is a fifth embodiment of the present invention.
Figure 18:
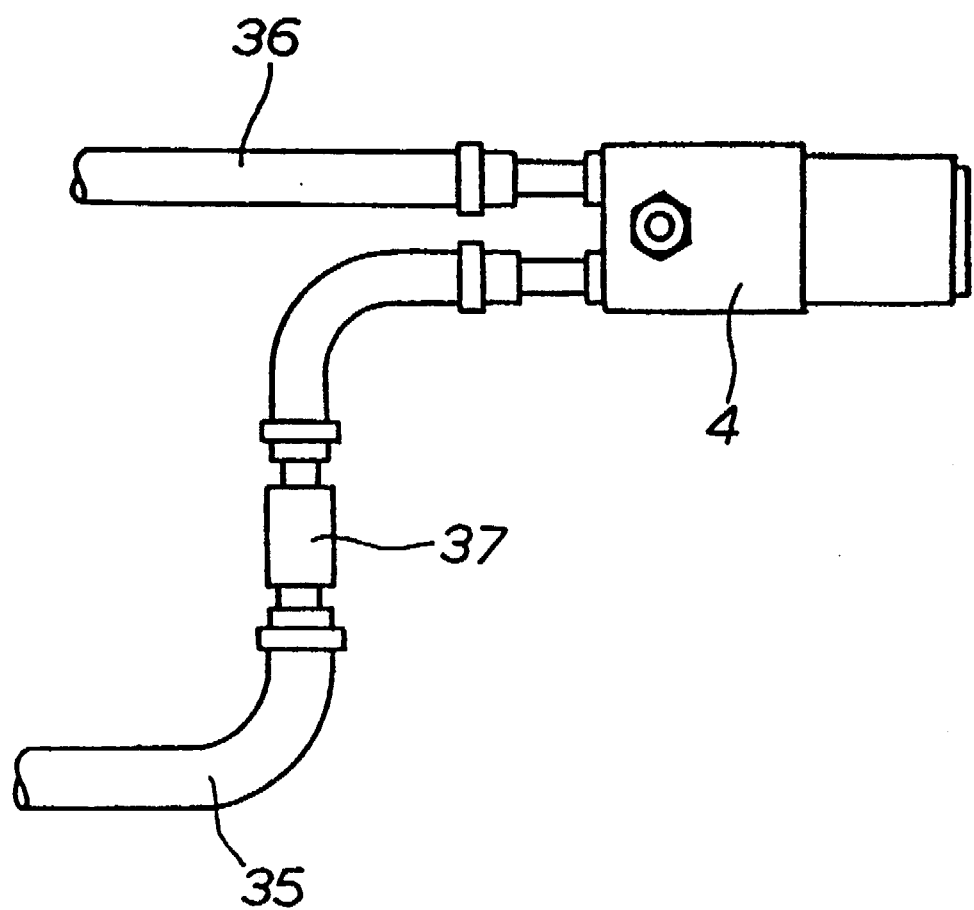
FIG. 18 is a partial view showing the mounting section of the flow rate control valve.
Figure 19:
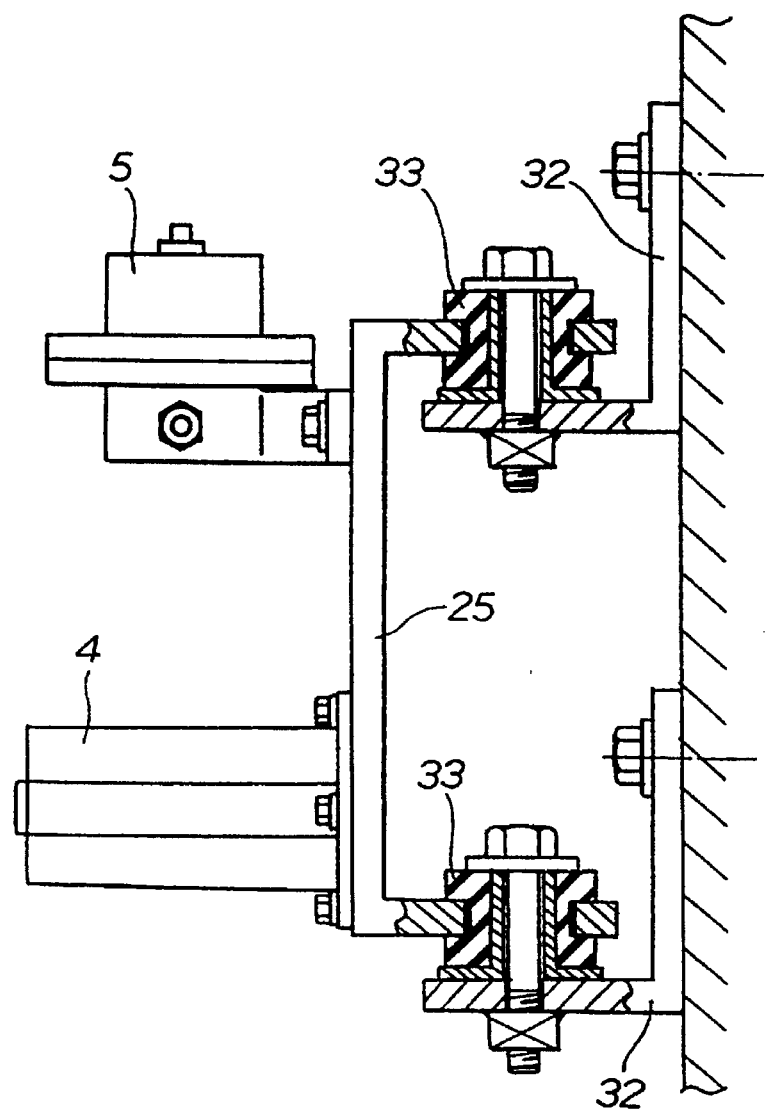
FIG. 19 is a partial sectional view showing a support structure for the regulator.
Figure 20:
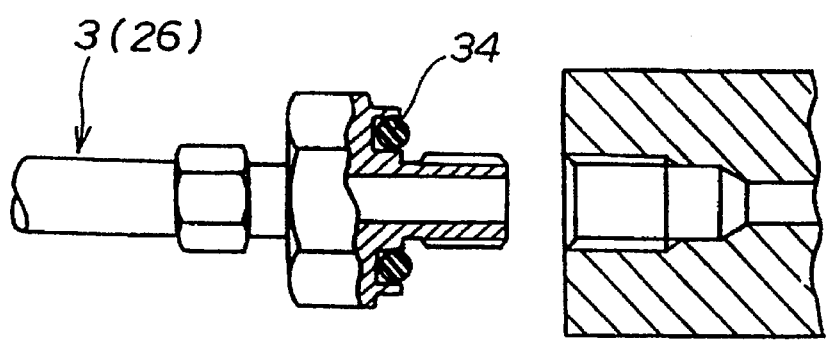
FIG. 20 is a partial sectional view showing a connection structure of a fuel line.

Now, the regulator for the gas fueled engine according to the fifth embodiment of the invention is described. FIG. 17 illustrates an input signal for controlling a flow rate control valve. FIG. 18 is a partial sectional view showing the mounting section of the flow rate control valve. FIG. 19 is a partial sectional view showing a support structure for the regulator, and FIG. 20 is a partial sectional view showing a connection structure of a fuel line.

In FIGS. 1 and 2, since the primary pressure regulator in the upstream with a higher decompression ratio tends to freeze gas components with relatively low fusing point because of adiabatic expansion, this embodiment is arranged as described later to introduce the cooling water, which has been heated after circulating through the engine 2, into the water passage 20 in the primary pressure regulator 4, and to adjust the temperature of the primary regulator by controlling the flow rate of the cooling water.

As shown in FIGS. 17 and 19, the secondary electromagnetic shut-off valve 18, the primary pressure regulator 4, the primary pressure sensor 22, and the secondary pressure regulator 5 are mounted on a single stay 25 which is then supported on a bracket 32 on the rear side of instrument panel through a rubber mount 33. This is to prevent intrusion of noise into the cabin by absorbing the operating noise and vibration of the regulators 4 and 5 with the rubber mount 33.

Most of the downstream section of the high pressure piping 3 is of metal tubes such as stainless steel, and rigidly mounted, but of a flexible hose near the filter 17 to the connection section of the stay 25. This is not to cause any stress on the metal high pressure piping even if there is slight play on mounting of the stay 25, and to provide a margin with the chassis mount. In addition, the low pressure piping 26 in the downstream to the secondary pressure regulator 5 is also of a flexible hose.

Connection of the fuel piping such as the high pressure piping 3 or the low pressure piping 26 has a structure shown in FIG. 20. The conventional CNG fuel piping typically employs such approach that male and female threaded portions are tapered, and the threaded portions are sealed by vulcanized tape. However, this approach lacks reliability. Thus, this embodiment is intended to improve the reliability by sealing it with an O-ring 34.

Now, the primary pressure regulator 4 is described in detail. It is arranged to introduce the engine cooling water, which has been heated by circulating in the engine 2, to the primary pressure regulator 4. That is, the cooling water heated by the engine 2 is fed from an introduction passage to a heat exchanger mounted in the cabin for heating the cabin. The cooling water heat exchanged by the heat exchanger is returned to the engine 2 through a return passage. A branch 35 as shown in FIGS. 17 and 18 is branched from the introduction passage from the engine 2 to the heat exchanger so that the cooling water is lead to the water passage 20 of the primary pressure regulator 4. The cooling water is discharged from a discharge passage 36, and returned to the return passage.

A flow rate control valve 37 is provided in the branch 35. Then, the cooling water flowing through the water passage 20 is controlled by the flow rate control valve 37 depending on the operation state of the engine 2 so that the primary pressure regulator 4 can exhibit its regulation capability. This embodiment feeds, as shown in FIG. 17, inlet temperature $T_R$ of the primary pressure regulator 4, the cooling water temperature $T_W$ of the engine 2 measured by the water temperature sensor 38, the number of revolutions of the engine Ne, the intake air pressure Pb measured by the intake air pressure sensor 40, or the vehicle speed V to the control unit 41 as the input signal for control, and performs control by any one of them or a combination of them. The flow rate control valve 37 may be a thermal valve of a wax type utilizing thermal expansion of paraffin.

Specifically, the control is performed, for example, by throttling the flow rate control valve 37 when the inlet temperature $T_R$ of the primary pressure regulator 4 or the water temperature $T_W$ of the engine cooling water, or by throttling the flow rate control valve 37 as the flow rate increases when the number of revolutions of the engine Ne increases. In addition, the flow rate control valve 37 is throttled when decrease of the intake air pressure Pb indicates opening of the throttle valve and heat generation increases, and is opened as the cooling capability is increased and the water temperature $T_W$ decreases when the vehicle speed V increases.

Furthermore, in a case where a thermal valve is used as the flow rate control valve 37 as described above, if the temperature of cooling water exceeds, for example, 80° C., it expands the seal in the primary pressure regulator 4, or adversely affects its spring or the like. Thus, it is arranged to maintain the temperature at an appropriate range of 40° C.–80° C. by shutting the passage at, for example, about 60° C.

As described, when the temperature of the primary pressure regulator 4 is appropriately maintained by controlling the flow rate of the cooling water which keeps the temperature of the primary pressure regulator 4, the pressure regulation function can be properly exhibited so that the pressure regulation accuracy is improved and precise fuel control is attained. In other words, there does not arise such disadvantage that the primary pressure regulator 4 is overheated or cooled to an extremely low temperature to prevent it from exhibiting its function.

In addition, since such operating conditions or the like can be easily performed, it is easy to meet such situations where input conditions or the like are desired to be changed due to aging or the like.

We claim:

1. A gas fuel supply system of a gas engine vehicle, comprising:

fuel supply stop means for avoiding abnormal combustion caused from improper adjustment of air/fuel ratio due to reduction of fuel pressure in the gas fuel supply system;

fuel shut-off means enabled to detect even slight variation of the fuel pressure by monitoring the fuel pressure in an interval after closing a fuel shut-off valve once opened to re-opening of it;

fuel system abnormal state sensing means for sensing an abnormal state in the fuel system by comparing an accumulated value of amount of injected fuel with a calculated value of consumption of fuel in a tank;

fuel injection valve control means for increasing lift load for a fuel injection valve at starting the engine at a low temperature and for enabling it to control the fuel injection valve open time; and a first regulator for holding the temperature of a second regulator regulating the fuel gas pressure, and for optimizing its performance by controlling flow rate of cooling water flowing through a water passage provided in the second regulator.

2. A fuel supply device for a vehicle having a pressure regulator in a fuel piping connecting a gas fuel tank and an engine and being adapted to supply a high-pressure gas held in said gas fuel tank to said engine after said gas is pressure reduced by means of said pressure regulator, said device comprising:

a fuel pressure sensor disposed upstream of said regulator;

fuel supply stopping means disposed between said gas fuel tank and said pressure regulator for stopping a fuel supply when said fuel pressure sensor detects a fuel pressure lower than a predetermined value; and gas supply means for supplying said pressure reduced gas from said pressure regulator to said engine, said pressure regulator being disposed between said gas supply means and said gas fuel tank.

3. A fuel supply device as set forth in claim 2, wherein said supply is terminated when any one of a tank gas pressure, a primary gas pressure and a secondary gas pressure are sensed by said fuel pressure sensor and are at a predetermined value or lower.

4. A fuel supply device as set forth in claim 3, wherein said predetermined values are set to be 13 kgf/cm² for said tank gas pressure, 7 kgf/cm² for said primary gas pressure, and 2 kgf/cm² for said secondary gas pressure.

5. A method for detecting an abnormal state in a fuel supply system having a pressure regulator in a fuel supply piping connecting a gas fuel tank and an engine and being adapted to supply a high-pressure gas held in said gas fuel tank to said engine after said high-pressure gas is pressure reduced, said method comprising the steps of:

detecting a pressure in said fuel piping connecting said fuel tank and said engine by meads of a fuel pressure sensor disposed upstream of said pressure regulator; and determining an abnormal state in said fuel supply system when the detected pressure is above a predetermined value and the rate of change in pressure is above a fixed value.

6. A fuel shut-off device for use on a vehicle, wherein a plurality of fuel shut-off valves and a plurality of pressure sensors are disposed with between a gas fuel tank and an engine, the fuel-shut-off valves being opened for a predetermined interval of time and then closed when an ignition system of said engine is energized, the pressure sensors monitoring pressure in the piping to open the fuel shut-off valves at the moment when a start signal of the engine is confirmed.

7. A fuel shut-off device as set forth in claim 6, wherein pressures monitored in said piping are tank gas pressure $P_0$ by the pressure sensors, primary gas pressure $P_1$, by a primary gas sensor, and secondary gas pressure $P_2$ by a secondary gas sensor.

8. A fuel shut-off device as set forth in claim 7, wherein warning is issued by turning on a warning indicator when there is pressure change in said monitored tank gas pressure $P_0$, primary gas pressure $P_1$, or secondary gas pressure $P_2$.

9. A system for sensing an abnormal state in a fuel system of a gas engine vehicle, comprising:

means for accumulating an injection amount of fuel to a fuel tank from injection gas engine; and means for estimating consumption of the fuel in a fuel tank from pressure and temperature in the fuel tank, wherein accumulated value and consumption are corrected for estimating actual gas, and then compared, whereby it is determined there is an abnormal state in the fuel system when the difference between both values exceeds a predetermined amount.

10. A system for sensing an abnormal state in a fuel system of a gas engine vehicle as set forth in claim 9, wherein amount of fuel injected from said fuel injection valves is found by accumulating valve open time for each fuel injection valve.

11. A system for sensing an abnormal state in a fuel system of a gas engine vehicle as set forth in claim 9, wherein fuel consumption within a predetermined interval of time is estimated by finding the fuel remaining in the tank in every predetermined interval of time from tank gas pressure $P_0$ and tank gas temperature $T_0$.

12. A fuel supply control unit for electromagnetically opening or closing a fuel injection valve of a fuel injection device of a gas fuel engine, comprising:

basic data detection means for detecting basic data for calculating sticking force of said fuel injection valve; and control means for controlling a lift load for the fuel injection valve, the sticking force being calculated from the basic data detected by the basic data detection means, wherein sticking force of the fuel injection valve is calculated from the basic data detected by said basic data detection means, wherein said control means controls a peak current value of the fuel injection valve so that said lift load becomes larger than said sticking force.

13. A fuel supply control unit as set forth in claim 12, wherein said control means controls valve open time of said fuel injection valve in addition to peak current value.

14. A fuel supply control unit as set forth in claim 12, wherein it is determined that there is an abnormal state when any one of water temperature of the engine, intake air temperature of the engine, or temperature of secondary gas supplied to the engine is at a predetermined temperature or less at said fuel injection valve.

15. A regulator for a gas fuel engine, which comprises a water passage provided in a regulator for regulating pressure of fuel gas for a water-cooled gas engine vehicle, cooling water circulated through the engine being caused to flow through the water passage, wherein a flow control valve is provided in path for said cooling water to flow, said flow rate control valve being controlled according to operation state of the vehicle.

16. A regulator for a gas fuel engine as set forth in claim 15, wherein operating conditions of said vehicle are determined by temperature of the regulator, temperature of cooling water for the engine, number of revolutions of the engine, intake air pressure of an engine manifold, or running speed of the vehicle, or a combination of them.

* * * * *